(12) United States Patent
Artmann

(10) Patent No.: US 12,224,631 B2
(45) Date of Patent: Feb. 11, 2025

(54) METHOD FOR PRODUCING A STATOR ASSEMBLY, AND STATOR ASSEMBLY

(71) Applicant: Vitesco Technologies GmbH, Hannover (DE)

(72) Inventor: Jens Artmann, Schwalbach a Ts. (DE)

(73) Assignee: Vitesco Technologies GmbH, Regensburg (DE)

( * ) Notice: Subject to any disclaimer, the term of this patent is extended or adjusted under 35 U.S.C. 154(b) by 756 days.

(21) Appl. No.: 17/271,789

(22) PCT Filed: Aug. 22, 2019

(86) PCT No.: PCT/EP2019/072448
§ 371 (c)(1),
(2) Date: Feb. 26, 2021

(87) PCT Pub. No.: WO2020/043589
PCT Pub. Date: Mar. 5, 2020

(65) Prior Publication Data
US 2021/0344261 A1    Nov. 4, 2021

(30) Foreign Application Priority Data
Aug. 27, 2018    (DE) ..................... 10 2018 214 441.9

(51) Int. Cl.
*H02K 11/40*    (2016.01)
*H02K 3/52*    (2006.01)
(Continued)

(52) U.S. Cl.
CPC ............. *H02K 11/40* (2016.01); *H02K 3/522* (2013.01); *H02K 15/0062* (2013.01); *H02K 15/12* (2013.01); *H02K 2203/03* (2013.01)

(58) Field of Classification Search
CPC ..... H02K 11/40; H02K 3/522; H02K 15/0062; H02K 15/12; H02K 2203/03
See application file for complete search history.

(56) References Cited

U.S. PATENT DOCUMENTS 6,051,899 A     4/2000  Walther et al.
6,888,284 B2 *  5/2005  Eggers .................. H02K 5/128
                                                          310/43
(Continued)

FOREIGN PATENT DOCUMENTS

CN    101588088    11/2009
CN    104734404     6/2015
(Continued)

OTHER PUBLICATIONS

Notice of Allowance dated Aug. 30, 2023 issued in Korean Patent Application No. 10-2021-7006414.
(Continued)

*Primary Examiner* — Jeffrey T Carley
*Assistant Examiner* — Jose K Abraham
(74) *Attorney, Agent, or Firm* — COZEN O'CONNOR

(57) ABSTRACT

A method for producing a stator assembly of an electric motor includes: providing a laminated core of the stator assembly; mounting at least one coil former on the laminated core; mounting a ground contact pin on the laminated core provided with the coil former; and overmolding the laminated core with plastic.

7 Claims, 1 Drawing Sheet

(51) Int. Cl.
*H02K 15/00* (2006.01)
*H02K 15/12* (2006.01)

(56) References Cited

U.S. PATENT DOCUMENTS

| | | | |
|---|---|---|---|
| 2003/0057530 A1* | 3/2003 | Karrer | H02M 7/003 |
| | | | 257/666 |
| 2004/0027014 A1* | 2/2004 | Weigold | H02K 11/33 |
| | | | 310/68 R |
| 2004/0070293 A1* | 4/2004 | Kabasawa | H02K 3/522 |
| | | | 310/71 |
| 2006/0138884 A1* | 6/2006 | Kabasawa | H02K 5/225 |
| | | | 310/260 |
| 2006/0175917 A1* | 8/2006 | Nanbu | H02K 5/225 |
| | | | 310/71 |
| 2006/0220474 A1 | 10/2006 | Yoshida | |
| 2010/0081302 A1 | 4/2010 | Atkinson et al. | |
| 2011/0234025 A1 | 9/2011 | Kado et al. | |
| 2013/0038146 A1* | 2/2013 | Hofmann | H02K 5/08 |
| | | | 310/43 |
| 2014/0138148 A1 | 5/2014 | Lee | |
| 2015/0123501 A1 | 5/2015 | Jang et al. | |
| 2015/0229188 A1* | 8/2015 | Miyashita | H01R 4/64 |
| | | | 310/71 |
| 2016/0087387 A1* | 3/2016 | Maerkle | H05K 3/108 |
| | | | 310/239 |

FOREIGN PATENT DOCUMENTS

| | | | | |
|---|---|---|---|---|
| CN | 107872113 | | 4/2018 | |
| CN | 108768091 A | * | 11/2018 | ............ H02K 1/148 |
| DE | 2447155 | | 4/1975 | |
| DE | 29910982 | | 10/1999 | |
| DE | 10119404 A1 | * | 10/2002 | ............ H02K 11/33 |
| DE | 102009016745 | | 6/2010 | |
| DE | 102011119789 A1 | * | 6/2013 | ............ H02K 11/40 |
| DE | 102012006020 A1 | * | 9/2013 | ............ H02K 11/40 |
| DE | 102015211800 | | 12/2015 | |
| DE | 102014114667 A1 | * | 4/2016 | ............ H02K 15/10 |
| DE | 102015122631 A1 | * | 6/2017 | |
| DE | 102016105585 | | 9/2017 | |
| EP | 1469710 A2 | | 10/2004 | |
| EP | 3340444 A2 | * | 6/2018 | ................ F01P 5/04 |
| GB | 1 427 417 | | 3/1976 | |
| JP | H 07-87696 | | 3/1995 | |
| JP | 2005-080480 | | 3/2005 | |

OTHER PUBLICATIONS

Office Action dated Feb. 20, 2023 issued in European Patent Application No. 19758707.4.
Office Action dated Feb. 14, 2023 issued in Chinese Patent Application No. 201980042266.3.
Office Action dated Feb. 20, 2023 issued in Korean Patent Application No. 10-2021-7006414.
International Search Report issued in corresponding PCT Application PCT/EP2019/072448.
Written Opinion issued in corresponding PCT Application PCT/EP2019/072448.

* cited by examiner

METHOD FOR PRODUCING A STATOR ASSEMBLY, AND STATOR ASSEMBLY

CROSS REFERENCE TO RELATED APPLICATIONS

This is a U.S. national stage of International application No. PCT/EP2019/072448, filed on Aug. 22, 2019, which claims priority to German Application No. 10 2018 214 441.9, filed Aug. 27, 2018, the content of each of which is incorporated herein by reference.

BACKGROUND OF THE INVENTION

1. Field of the Invention

The present invention relates to a method for producing a stator assembly of an electric motor.

2. Description of the Prior Art

The stator lamination of electric motors should be electrically connected to ground in order to be able to comply with the prescribed EMC limit values (electromagnetic compatibility). The ground connection improves the electromagnetic compatibility.

However, since such stator assemblies usually have a completely overmolded stator lamination, the electrical contacting is made more difficult. This problem has previously been solved for example as follows: By a shielding by a metallic housing, by a ground connection by the interference fit between the stator lamination and the actuator housing or by a subsequently provided contact via the stator bore, electrically conductive grease and a silver-plated contact spring. There have also been cases in which no ground connection at all was provided, which resulted in poor electromagnetic compatibility.

SUMMARY OF THE INVENTION

It is an object of the present invention to provide a method for producing a stator assembly which allows a ground connection to be carried out in a particularly effective manner.

This object may be achieved according to the invention by a method for producing a stator assembly of an electric motor which includes the following steps:
  providing a laminated core of the stator assembly;
  mounting at least one coil former on the laminated core;
  mounting a ground contact pin on the laminated core provided with the coil former; and
  overmolding the laminated core with plastic.

In the case of the method according to the invention, subsequent processing of the overmolded stator assembly is not required to carry out the ground connection. Rather, a ground contact pin is mounted on the laminated core provided with the coil former, after which the laminated core provided with the ground contact pin is overmolded. In this way, a ground connection can be carried out without additional or subsequent processing of the stator lamination.

The ground contact pin is preferably mounted on the coil former in contact with the laminated core. The ground contact pin is in this case preferably mounted in a receptacle on the coil former. The ground connection is therefore established with the help of the mounted coil former.

In a particularly preferred solution of the method according to an aspect of the invention, the ground contact pin is mounted as a press-fit pin. Specifically, a press-fit connection is in this case established with the receptacle provided on the coil former, with this press-fit connection creating the necessary contact with the laminated core of the stator assembly. Overall, in this embodiment the method according to an aspect of the invention therefore proceeds such that a coil former provided with a receptacle for the press-fit pin is mounted on the laminated core, after which the press-fit pin is inserted into the receptacle and pressed with it to establish a press-fit connection. As mentioned, this allows the press-fit pin to come into contact with the laminated core to prepare the corresponding ground connection. After that, the laminated core can be correspondingly overmolded.

A leadframe pin is preferably used and configured as the ground contact pin or press-fit pin.

To establish the ground connection, the ground contact pin is preferably connected to the circuit board of the stator assembly.

The ground contact pin can also be arranged such that the mounted at least one coil former is additionally fixed on the ground contact pin.

With the method according to an aspect of the invention, a number of ground contact pins can also be mounted, one ground contact pin being assigned to each coil former. For example, in a stator assembly, three coil formers are mounted on a laminated core, and three ground contact pins are attached to the coil formers in contact with the laminated core, one ground contact pin being assigned to each coil former.

A series of advantages are achieved with the method according to the invention. As already mentioned, subsequent processing of the overmolded stator is no longer necessary. The ground connection with the circuit board means that there is no need for an additional contact plate on the circuit board. As also already mentioned, additional fixing of the circuit board can be achieved with the attachment of the ground contact pin. The ground contact pin can also serve as additional fixing of the mounted coil former or formers.

The present invention also relates to a stator assembly that has been produced by a method of the type described above.

BRIEF DESCRIPTION OF THE DRAWINGS

The invention will be explained in detail below with reference to an exemplary embodiment in conjunction with the drawings. In the drawings.

DETAILED DESCRIPTION OF THE PRESENTLY PREFERRED EMBODIMENTS

Figure 1A:
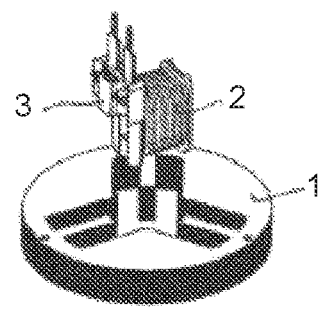
FIGS. 1A-1E illustrate several steps of the method according to the invention.
Figure 1B:
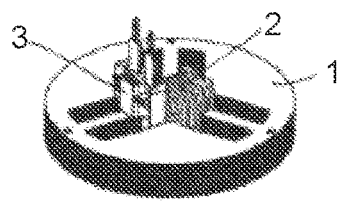

In the method according to the invention for producing a stator assembly of an electric motor, a laminated core 1, which has three recesses for respectively receiving a coil former 2, is provided. FIGS. 1A and 1B show how a coil former 2 is mounted on the laminated core 1 by being pushed onto a tongue in a recess.

Figure 1C:
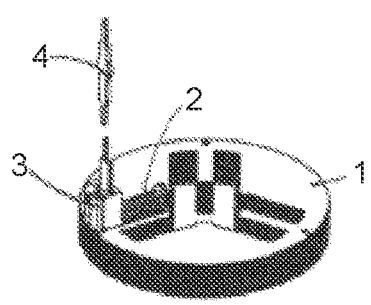
Figure 1D:
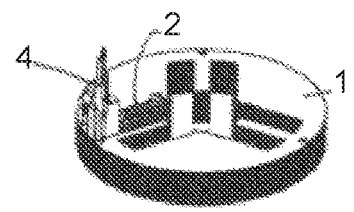

FIG. 1C shows how the coil former has reached its radial end position in the corresponding recess. It has, at its radial end, a pocket-shaped receptacle 3, into which a press-fit pin 4 is inserted from above and is connected to the receptacle 3 of the coil former 2 with a press-fit connection. The press-fit pin 4 in this case comes into contact at its lower end with the laminated core 1 in order to achieve a ground connection there. FIG. 1D shows the press-fit pin 4 in its end position.

After that, further coil formers can be inserted into the corresponding recesses and provided with press-fit pins, which is not shown here however.

Figure 1E:
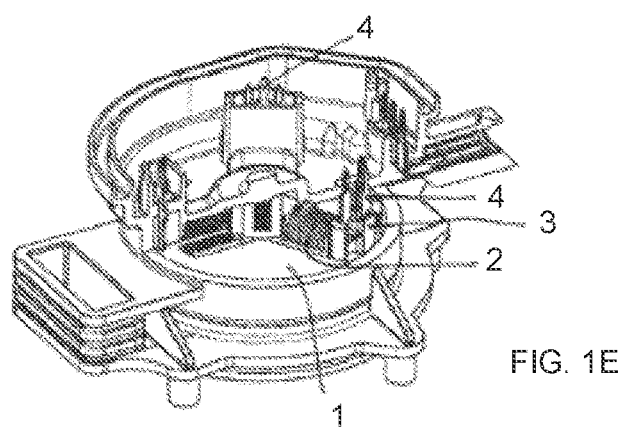

The stator assembly produced in this way, which is provided with corresponding ground contact pins 4, is then overmolded with plastic in a suitable way, so that the object shown in FIG. 1E is obtained. It can be seen that three coil formers 2 are thereby each provided with a press-fit pin as a ground contact pin 4, which is connected to the respective coil former via a press-fit connection and provides a ground connection to the laminated core 1.

The ground contact pins 4 provided in this way are then brought into contact with a circuit board (not shown here). Along with the desired ground connection, this additionally fixes the circuit board.

Although exemplary embodiments have been discussed in the above description, it should be noted that numerous modifications are possible. Furthermore, it should be noted that the exemplary embodiments are merely examples which are not intended to limit the scope of protection, the applications and the structure in any way. Rather, a person skilled in the art will take from the above description a guideline for implementation of at least one exemplary embodiment, wherein various modifications may be made, in particular with regard to the function and arrangement of the described components, without departing from the scope of protection as can be gathered from the claims and equivalent feature combinations.

The invention claimed is:

1. A method for producing a stator assembly of an electric motor, the method comprising:
   providing a laminated core (1) of the stator assembly;
   mounting at least one coil former (2) on the laminated core (1);
   mounting a ground contact pin (4), formed as a lead frame pin, on the laminated core (1) in a receptacle (3) on the coil former (2) so that the ground contact pin (4) extends axially parallel to a longitudinal axis of the stator assembly; and
   overmolding the laminated core and a portion of the ground contact pin (4) with plastic after mounting the ground contact pin (4) on the laminated core (1) provided with the coil former (2),
   wherein an end of the ground contact pin (4), opposite the laminated core, is exposed from the overmolding.

2. A method for producing a stator assembly of an electric motor, the method comprising:
   providing a laminated core (1) of the stator assembly;
   mounting at least one coil former (2) on the laminated core (1);
   mounting a ground contact pin (4), formed as a lead frame pin, on the laminated core (1) provided with the coil former (2); and
   overmolding the laminated core and a portion of the ground contact pin (4) with plastic after mounting the ground contact pin (4) on the laminated core (1) provided with the coil former (2),
   wherein the ground contact pin (4) is mounted on the coil former (2) in contact with the laminated core (1).

3. The method as claimed in claim 2, wherein the ground contact pin (4) is mounted in a receptacle (3) on the coil former (2).

4. The method as claimed in claim 1, wherein the ground contact pin (4) is mounted as a press-fit pin.

5. The method as claimed in claim 1, further comprising mounting the ground contact pin (4) to a circuit board of the stator assembly.

6. A method for producing a stator assembly of an electric motor, the method comprising:
   providing a laminated core (1) of the stator assembly;
   mounting at least one coil former (2) on the laminated core (1);
   mounting a ground contact pin (4), formed as a lead frame pin, on the laminated core (1) provided with the coil former (2); and
   overmolding the laminated core and a portion of the ground contact pin (4) with plastic after mounting the ground contact pin (4) on the laminated core (1) provided with the coil former (2),
   wherein at least one coil former (2) mounted on the laminated core is fixed, at least in part, by the ground contact pin (4).

7. A stator assembly produced by the method of claim 1.

* * * * *